(12) United States Patent
Sakai

(10) Patent No.: US 10,164,558 B2
(45) Date of Patent: Dec. 25, 2018

(54) ELECTRIC MOTOR CONTROL DEVICE

(71) Applicant: DENSO CORPORATION, Kariya, Aichi-pref. (JP)

(72) Inventor: Koji Sakai, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/752,950

(22) PCT Filed: Jun. 23, 2016

(86) PCT No.: PCT/JP2016/068587
§ 371 (c)(1),
(2) Date: Feb. 15, 2018

(87) PCT Pub. No.: WO2017/033551
PCT Pub. Date: Mar. 2, 2017

(65) Prior Publication Data
US 2018/0241333 A1 Aug. 23, 2018

(30) Foreign Application Priority Data
Aug. 25, 2015 (JP) ................................. 2015-165549

(51) Int. Cl.
*H02P 21/00* (2016.01)
*H02P 21/18* (2016.01)
(Continued)

(52) U.S. Cl.
CPC ........... *H02P 21/18* (2016.02); *B60H 1/3222* (2013.01); *H02P 21/22* (2016.02)

(58) Field of Classification Search
CPC .................................. H02P 21/18; H02P 21/22
(Continued)

(56) References Cited

U.S. PATENT DOCUMENTS

| 2008/0048599 | A1* | 2/2008 | Ho ........................... H02P 6/185 318/400.33 |
| 2013/0049656 | A1* | 2/2013 | Yasui ...................... H02P 21/00 318/400.02 |

(Continued)

FOREIGN PATENT DOCUMENTS

| JP | 2007124835 A | 5/2007 |
| JP | 2007124836 A | 5/2007 |
| JP | 2009254112 A | 10/2009 |

*Primary Examiner* — Erick Glass
(74) *Attorney, Agent, or Firm* — Harness, Dickey & Pierce, P.L.C.

(57) ABSTRACT

An electric motor control device includes a control unit that controls operation of a drive circuit supplying electric power to an electric motor and a current sensor that detects current generated in the electric motor. The control unit detects fundamental high frequency current generated when the electric motor is applied with fundamental high frequency voltage for estimating the magnetic pole position, selects first electric angle and second electric angle corresponding to a d-axis direction of the magnetic pole position, detects first specific high frequency current generated when a position of the first electric angle is applied with specific high frequency voltage and second specific high frequency current generated when a position of the second electric angle is applied with the specific high frequency voltage, and compares the first and the second specific high frequency currents to estimate a positive d-axis direction of the magnetic pole position.

12 Claims, 11 Drawing Sheets

(51) Int. Cl.
*B60H 1/32* (2006.01)
*H02P 21/22* (2016.01)

(58) Field of Classification Search
USPC .................................................. 318/400.02
See application file for complete search history.

(56) References Cited

U.S. PATENT DOCUMENTS

| | | | | |
|---|---|---|---|---|
| 2014/0049202 A1* | 2/2014 | Fukumaru | ............. | H02P 21/146 318/400.32 |
| 2014/0232306 A1* | 8/2014 | Yasui | ........................ | H02P 6/00 318/400.02 |

* cited by examiner

MAJOR AXIS OF CURRENT ELLIPTIC TRAJECTORY (= d-AXIS DIRECTION)

ELECTRIC MOTOR CONTROL DEVICE

CROSS REFERENCE TO RELATED APPLICATIONS

This application is a U.S. National Phase Application under 35 U.S.C. 371 of International Application No. PCT/JP2016/068587 filed on Jun. 23, 2016 and published in Japanese as WO 2017/033551 A1 on Mar. 2, 2017. This application is based on and claims the benefit of priority from Japanese Patent Application No. 2015-165549 filed on Aug. 25, 2015. The entire disclosures of all of the above applications are incorporated herein by reference.

TECHNICAL FIELD

The present disclosure relates to an electric motor control device that controls driving of an electric motor based on a magnetic pole position of a rotor.

BACKGROUND ART

A so-called position sensor-less control device that controls the driving of an electric motor without the use of a position sensor for detecting a magnetic pole position of a rotor has been known. Up to now, there is a high frequency voltage estimation method that applies a high frequency voltage higher than a frequency of a drive voltage of the electric motor to the electric motor, to thereby estimate the magnetic pole position of the rotor. First, the high frequency voltage estimation method will be described.

In a salient pole type synchronous motor, an inductance of an armature coil is minimized in a d-axis direction on a rotational orthogonal coordinate (dq axis coordinate) system. Therefore, when a high frequency voltage rotating with a predetermined amplitude at a predetermined frequency is applied to the armature coil, a trajectory of the high frequency current on a fixed orthogonal coordinate ($\alpha\beta$ axis coordinate) system at that time is presented as shown in FIG. 11. FIG. 11 is a graph showing a trajectory of a high frequency voltage Vh and a trajectory of a high frequency current Ih in the $\alpha\beta$ axis coordinate system. As shown in FIG. 11, the trajectory of the high frequency current Ih has an elliptical shape. Hereinafter, the ellipse is also referred to as a current elliptical trajectory. In FIG. 11, the magnetic pole position of the rotor is determined as an angle $\theta$ formed by a d-axis with respect to an $\alpha$-axis. In this case, when it is assumed that an $\alpha$-axis component and a $\beta$-axis component of a maximum value Imax of the amplitude of the high frequency current Ih in the current elliptical trajectory of one cycle of the high frequency voltage are "Imax$\alpha$" and "Imax$\beta$", respectively, a relationship of "tan $\theta$=Imax $\beta$/Imax $\alpha$" is established. With the use of the above relationship, the magnetic pole position $\theta$ of the rotor can be calculated based on the detection values of "Imax $\alpha$" and "Imax $\beta$".

In the case where the current elliptic trajectory has a symmetrical shape as shown in FIG. 11, in one cycle of the high frequency voltage Vh, there are two maximum amplitude values Imax1 and Imax2 in the major axis direction of one cycle of the current elliptical trajectory. The "Imax1" is a maximum value on a positive side in the major axis direction, in other words, a maximum amplitude value in an N pole direction of the major axis direction. The "Imax2" is a maximum value on a negative side in the major axis direction, in other words, a maximum amplitude value in an S pole direction of the long axis direction. In other words, two maximum values of the high frequency current Ih are extracted from one cycle of the current elliptical trajectory. Conveniently, in a PM synchronous motor (magnet rotor synchronous motor), in a situation where a magnetic circuit has a magnetic saturation tendency responsive to the high frequency current, when a direction of a magnetic flux caused by the high frequency current matches a direction of the magnet flux of the rotor, an inductance of the armature coil decreases as compared with the case where those directions are opposite to each other. A long diameter of the current elliptical trajectory is increased as the inductance of the armature coil is decreased. In other words, as shown in FIG. 12, the current elliptical trajectory has an irregular shape extending in the N pole direction of the major axis direction. For that reason, if the maximum amplitude value is selected from each data of the high frequency current Ih for one cycle of the current elliptical trajectory, the maximum amplitude value Imax2 in the S pole direction of the major axis direction is naturally excluded and the maximum amplitude value Imax1 in the N pole direction of the major axis direction can be extracted. Therefore, the magnetic pole position $\theta$ of the rotor can be estimated through the above arithmetic expression based on the extracted maximum amplitude value Imax 1 in the N pole direction of the major axis direction.

However, when the estimation method of the above type is used, if a difference between the maximum amplitude value Imax1 in the N pole direction of the major axis direction and the maximum amplitude value Imax2 in the S pole direction of the major axis direction is small, there is a possibility that the "Imax2" is erroneously determined as the maximum amplitude value in the N pole direction of the major axis direction. In that case, if the magnetic pole position $\theta$ of the rotor is calculated on the basis of the "Imax2", there is a possibility that the magnetic pole position of the rotor is erroneously determined to be deviated by 180° in an electric angle.

Therefore, in the control device disclosed in Patent Literature 1, a difference value $\Delta I$ (=Imax1−Imax2) between one maximum amplitude value Imax1 and the other maximum amplitude value Imax2 is calculated, and the amplitude of the high frequency voltage is adjusted so that the difference value $\Delta I$ falls within a preferable range. As a result, a state in which the difference between one maximum amplitude value Imax1 and the other maximum amplitude value Imax2 is large can be maintained. Therefore, when the maximum amplitude value is selected from each data of the high frequency current Ih for one cycle of the current elliptical trajectory, the maximum amplitude value Imax1 in the N pole direction of the major axis direction can be more reliably extracted. Therefore, an estimation accuracy of the magnetic pole position $\theta$ of the rotor can be improved.

Incidentally, in order to increase the estimation accuracy of the magnetic pole position of the rotor in the control device disclosed in Patent Literature 1, the amplitude of the high frequency voltage needs to be increased over an entire range of the electric angle. As a result, the amplitude of the high frequency current also increases. When the amplitude of the high frequency current increases, for example, there is a possibility that the amount of heat generated by a drive circuit (inverter circuit) of the electric motor and the amount of heat generated by the electric motor per se may increase.

PRIOR ART LITERATURE

Patent Literature

Patent Literature 1: JP 2007-124835 A

SUMMARY OF INVENTION

It is an object of the present disclosure to provide an electric motor control device capable of reducing a heat generation while improving an estimation accuracy of a magnetic pole position.

An electric motor control device according to an aspect of the present disclosure controls driving of an electric motor based on a magnetic pole position of a rotor, and includes a control unit that controls the operation of a drive circuit supplying an electric power to the electric motor, and a current sensor that detects a current generated in the electric motor. The control unit detects, through the current sensor, a fundamental high frequency current generated in the electric motor when the electric motor is applied with a fundamental high frequency voltage for estimating the magnetic pole position through the drive circuit, and selects a first electric angle and a second electric angle corresponding to a d-axis direction of the magnetic pole position based on a detection value of the fundamental high frequency current. The control device detects, through the current sensor, a first specific high frequency current generated in the electric motor when a position of the first electric angle is applied with a specific high frequency voltage through the drive circuit and a second specific high frequency current generated in the electric motor when a position of the second electric angle is applied with the specific high frequency voltage through the drive circuit. The control device compares a detection value of the first specific high frequency current with a detection value of the second specific high frequency current to estimate a positive d-axis direction of the magnetic pole position.

According to the configuration described above, the specific high frequency voltage to be applied to the position of the first electric angle and the specific high frequency voltage to be applied to the position of the second electric angle are merely increased, thereby being capable of enhancing the estimation accuracy of the positive d-axis direction of the magnetic pole position. Therefore, as compared with the conventional electric motor control device, which is required to increase the high frequency voltage over the entire range of the electric angle in order to improve the estimation accuracy, the heat generation of the drive circuit and the electric motor can be reduced.

On the other hand, if the first electric angle and the second electric angle corresponding to the d-axis direction of the magnetic pole position are selected based on the detection value of the fundamental high frequency current, there is a high possibility that one of the first electric angle and the second electric angle is the positive d-axis direction of the magnetic pole position. Therefore, when the first specific high frequency current generated in the electric motor when the position of the first electric angle is applied with the specific high frequency voltage, and the second specific high frequency current generated in the electric motor when the position of the second electric angle is applied with the specific high frequency voltage are acquired, and then the positive d-axis direction of the magnetic pole position is estimated by comparing those specific high frequency currents with each other, the estimation accuracy of the magnetic pole position can be improved.

BRIEF DESCRIPTION OF DRAWINGS

The above and other objects, features and advantages of the present disclosure will become more apparent from the following detailed description made with reference to the accompanying drawings, in which.

DESCRIPTION OF EMBODIMENTS

An electric motor control device according to an embodiment will be described below. First, a control system for a vehicle including the electric motor and the control device will be described.

Figure 1:
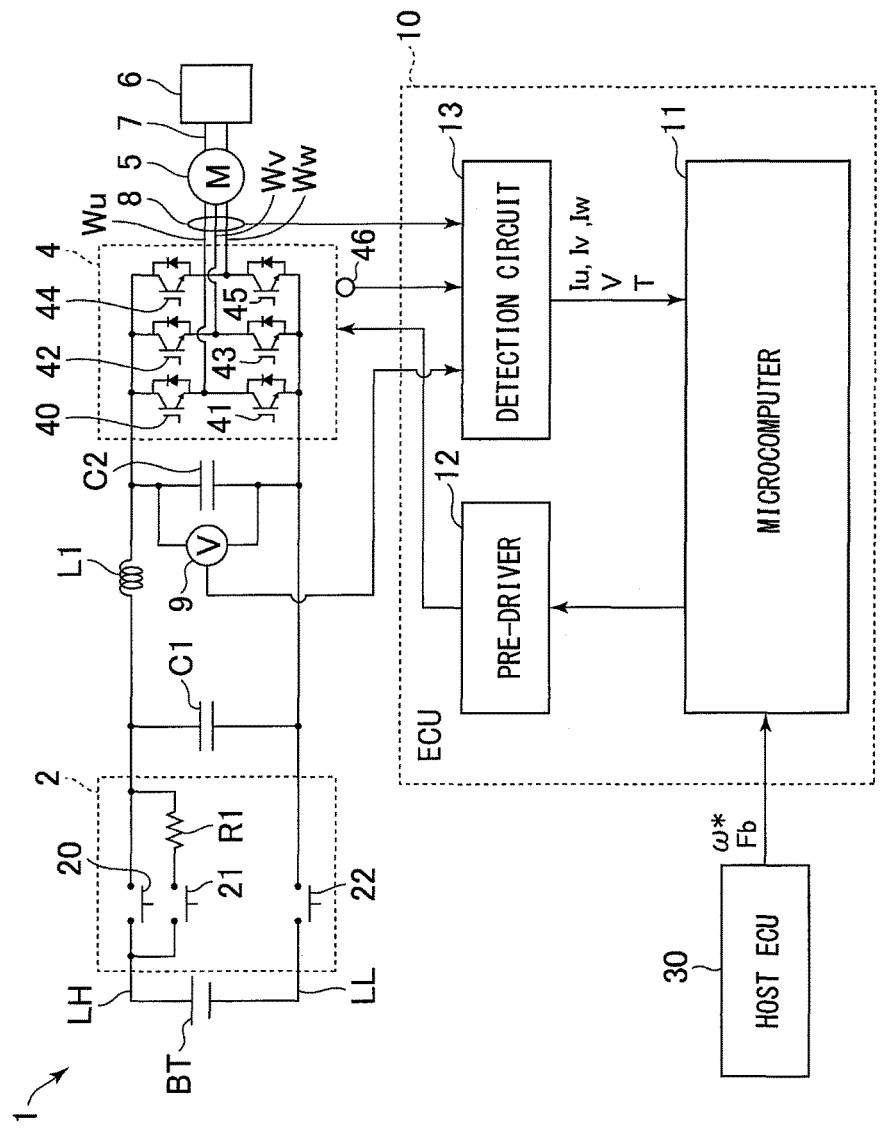
FIG. 1 is a block diagram showing a configuration of an electric motor control device according to an embodiment.

A control system 1 shown in FIG. 1 is mounted on a vehicle. The control system 1 includes a high voltage battery BT, a relay circuit 2, an inverter circuit 4, an electric motor 5, and a compressor 6, mounted on a vehicle.

A high potential side wire LH and a low potential side wire LL of the high voltage battery BT are connected to the inverter circuit 4 through the relay circuit 2.

The relay circuit 2 includes three relays 20, 21, and 22 and a precharge resistor R1. The relay 20 is disposed on the high potential side wire LH of the high voltage battery BT. The precharge resistor R1 is connected in parallel to the relay 20. The relay 21 is connected in series with the precharge resistor R1. The relay 22 is disposed on the low potential side wire LL. The relay circuit 2 connects and shuts off a power supply path from the high voltage battery BT to the electric motor 5 by the operation of opening and closing the relays 20, 21, and 22. The relay circuit 2 has a function of restricting the occurrence of an inrush current when a high voltage is applied to the inverter circuit 4. Further, when an abnormality occurs in the control system 1, the relay circuit 2 shuts off the power supply path from the high voltage battery BT to the electric motor 5.

Smoothing capacitors C1, C2 and a coil L1 are provided between the relay circuit 2 and the inverter circuit 4. The smoothing capacitors C1 and C2 are disposed between the high potential side wire LH and the low potential side wire LL. The smoothing capacitors C1 and C2 smooth a DC power to be supplied from the high voltage battery BT to the inverter circuit 4. The coil L1 and the smoothing capacitor C2 configure an LC filter.

The inverter circuit 4 includes a series circuit of a switching element 40 and a switching element 41, a series circuit of a switching element 42 and a switching element 43, and a series circuit of a switching element 44 and a switching element 45. The inverter circuit 4 has a configuration in which those series circuits are connected in parallel to each other. The switching elements 40, 42, and 44 configure an upper arm of the inverter circuit 4. The switching elements 41, 43, and 45 configure a lower arm of the inverter circuit 4. The switching elements 41, 43, and 45 are formed of, for example, IGBTs. A diode connected in parallel to each of the switching elements 40 to 45 is formed of a freewheeling diode. The inverter circuit 4 converts a DC power to be supplied from the high voltage battery BT into a three-phase AC power by on and off operation of the switching elements 40 to 45. The three-phase AC power is supplied to the electric motor 5 through feeder lines Wu, Wv, and Ww of the respective phases. In this manner, the inverter circuit 4 functions as a drive circuit that supplies an electric power to the electric motor 5.

The electric motor 5 is a permanent magnet synchronous motor having a saliency and using a permanent magnet for a field. The permanent magnet is provided on a non-illustrated rotor of the electric motor 5. The electric motor 5 is driven based on the three-phase AC power supplied from the inverter circuit 4 through the feeder lines Wu, Wv, and Ww. The electric motor 5 is mechanically coupled to the compressor 6 through a connecting shaft 7. The power of the electric motor 5 is transmitted to the compressor 6 through the connecting shaft 7, to thereby operate the compressor 6.

The compressor 6 is a device using the electric motor 5 as a power source. The compressor 6 is, for example, a compressor used for a vehicle air conditioning apparatus. The compressor functions as a pump for compressing and circulating the refrigerant in the air conditioning apparatus. As the compressor, a scroll compressor or a rotary compressor is used.

The control system 1 includes an electronic control unit (ECU) 10. In the present embodiment, the ECU 10 corresponds to a control device. The ECU 10 includes a current sensor 8 and a voltage sensor 9.

The current sensor 8 detects each phase current flowing through the feeder lines Wu, Wv, and Ww, that is, a current generated in the electric motor 5. As the current sensor 8, a current sensor of a current transformer type, a current sensor of a Hall element type, a current sensor of a shunt resistor type or the like can be used. The current sensor 8 outputs a signal corresponding to each detected phase current to the ECU 10.

The voltage sensor 9 detects a voltage between both terminals of the capacitor C2, in other words, a DC voltage to be input to the inverter circuit 4. As the voltage sensor 9 voltage sensor of a resistance voltage division type or the like can be used. The voltage sensor 9 outputs a signal corresponding to a detected input voltage of the inverter circuit 4 to the ECU 10.

The inverter circuit 4 is provided with a temperature sensor 46. The temperature sensor 46 detects a temperature of the inverter circuit 4 and outputs a signal corresponding to the detected temperature to the ECU 10.

The ECU 10 includes a microcomputer 11, a pre-driver 12, and a detection circuit 13. In the present embodiment, the microcomputer 11 corresponds to a control unit.

The pre-driver 12 generates a pulsed drive signal corresponding to the PWM (pulse width modulation) signal transmitted from the microcomputer 11. The drive signal is a signal capable of turning on and off the switching elements 40 to 45 of the inverter circuit 4. In other words, the switching elements 40 to 45 are turned on and off based on the drive signal transmitted from the pre-driver 12.

The detection circuit 13 receives output signals from the current sensor 8, the voltage sensor 9, the temperature sensor 46 and the like, converts those output signals into information on state amounts used for control calculation, and outputs the converted information to the microcomputer 11. The detection circuit 13 converts, for example, the output signal of the current sensor 8 into information on the phase current values Iu, Iv and Iw, and outputs the converted information to the microcomputer 11. Each of the phase current values Iu, Iv, and Iw is a current value of each of U-phase, V-phase, and W-phase to be supplied to the electric motor 5. The detection circuit 13 converts the output signal of the voltage sensor 9 into information on an input voltage value V of the inverter circuit 4 and outputs the converted information to the microcomputer 11. The detection circuit 13 converts the output of the temperature sensor 46 into information on a temperature T of the inverter circuit 4 and outputs the converted information to the microcomputer 11.

The microcomputer 11 controls driving of the electric motor 5 based on an instruction from a host ECU 30. The host ECU 30 is, for example, an ECU for vehicle control and an ECU for air conditioning control. The host ECU 30 transmits a rotational speed command value ω* to the microcomputer 11. The rotational speed command value ω* is a target value of the rotational speed of the rotor of the electric motor 5. Further, the host ECU 30 transmits an operation flag Fb to the microcomputer 11. When permitting the driving of the electric motor 5, the host ECU sets the operation flag Fb to an on state. When prohibiting the driving of the electric motor 5, the host ECU 30 sets the operation flag Fb to the on state.

The microcomputer 11 takes in various state amounts such as the phase current values Iu, Iv and Iw, the input voltage value V of the inverter circuit 4, and the temperature T of the inverter circuit 4 from the detection circuit 13. The microcomputer 11 generates a PWM signal based on the rotational speed command value ω* and the operation flag Fb and the like transmitted from the host ECU 30 in addition to various state amounts taken in from the detection circuit 13. The microcomputer 11 transmits the PWM signal to the pre-driver 12 to control the operation of the inverter circuit 4, and subjects the electric motor 5 to PWM control. In other words, the microcomputer 11 according to the present embodiment controls the driving of the electric motor 5 without the use of a position sensor for detecting the position of the rotor of the electric motor 5, in other words, in a position sensor-less manner.

Next, the drive control of the electric motor 5 to be executed by the microcomputer 11 will be described with reference to FIG. 2. The microcomputer 11 starts a process shown in FIG. 2 based on a start signal transmitted from the host ECU 30. The start signal is a signal to be transmitted from the host ECU 30 to the ECU 10 when activating the electric motor 5 that is in a stopped state.

First, the microcomputer 11 executes an initial position estimation process (S1). The initial position estimation process is a process of estimating a magnetic pole position (electric angle) of the rotor at the time of activating the electric motor 5. Hereinafter, the magnetic pole position of the rotor at the time of activating the electric motor 5 is also referred to as "initial position of the rotor". Specifically, the microcomputer 11 drives the inverter circuit 4 so that a high frequency voltage is applied to the motor 5. The microcomputer 11 estimates an initial position of the rotor based on the high frequency current generated in the electric motor 5 when the high frequency voltage is applied to the electric motor 5.

Subsequently to the process of S1, the microcomputer 11 executes an activation control of the electric motor 5 (S2). Specifically, for example, the microcomputer 11 generates a PWM signal that causes the respective phase current values Iu, Iv, and Iw with a constant amplitude and a gradual increase in operating frequency to be supplied to the electric motor 5 with reference to the initial position of the rotor obtained in S1. The microcomputer 11 transmits the PWM signal to the pre-driver 12 to drive the inverter circuit 4. As a result, the rotor is forcedly commutated and starts to rotate. When the rotational speed of the rotor rises up to a predetermined rotational speed, the microcomputer 11 proceeds to a process of S3.

The microcomputer 11 executes a normal control of the electric motor 5 as the process of S3. More specifically, the microcomputer 11 estimates the magnetic pole position of the rotor from the respective phase current values Iu, Iv, and Iw detected when the rotor is rotating, through a rotor position estimation method using, for example, an extended induced voltage. Also, the microcomputer 11 calculates a differential value of the estimated magnetic pole position to estimate an actual rotational speed of the rotor. The microcomputer 11 generates the PWM signal with the execution of a feedback control based on a deviation between the estimated actual rotational speed of the rotor and the rotational speed command value ω* transmitted from the host ECU 30. The microcomputer 11 transmits the generated PWM signal to the pre-driver 12 to drive the inverter circuit 4. As a result, the rotational speed of the electric motor 5 is controlled so as to follow the rotational speed command value ω*.

Subsequently to the process of S3, the microcomputer 11 acquires the operation flag Fb from the host ECU 30 (S4), and determines whether the operation flag Fb is in the on state, or not (S5). When the operation flag Fb is on (yes in S5), that is, when the host ECU 30 permits the driving of the electric motor 5, the microcomputer 11 continues the normal control of the electric motor 5 (S3).

When the operation flag Fb is in an off state (no in S5), that is, when the host ECU 30 prohibits the driving of the electric motor 5, the microcomputer 11 performs a stop control of the electric motor 5 (S6), to thereby stop the electric motor 5.

Figure 2:
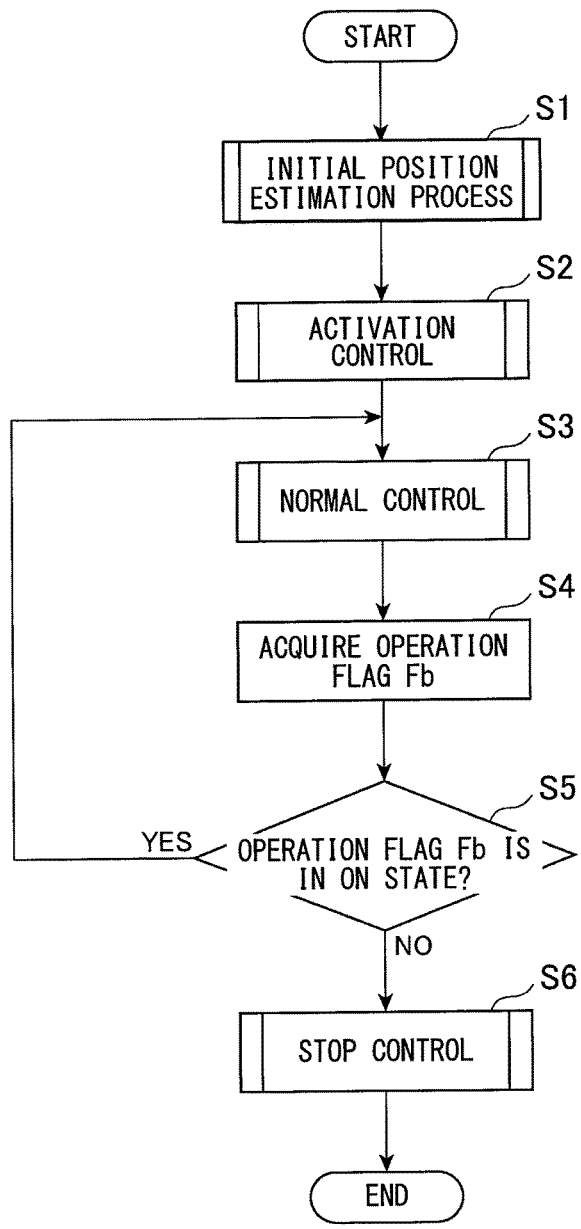
FIG. 2 is a flowchart showing a procedure of a process to be executed by the control device.

Aside from the process shown in FIG. 2, the microcomputer 11 monitors an operation state of the inverter circuit 4 based on the input voltage value V, the temperature T and so on of the inverter circuit 4. When abnormality of the inverter circuit 4 is detected based on the input voltage value V, the temperature T, and so on of the inverter circuit 4, the microcomputer 11 also executes a process of stopping the drive control of the electric motor 5.

Next, a procedure of the initial position estimation process to be executed by the microcomputer 11 will be described in detail.

Figure 3:
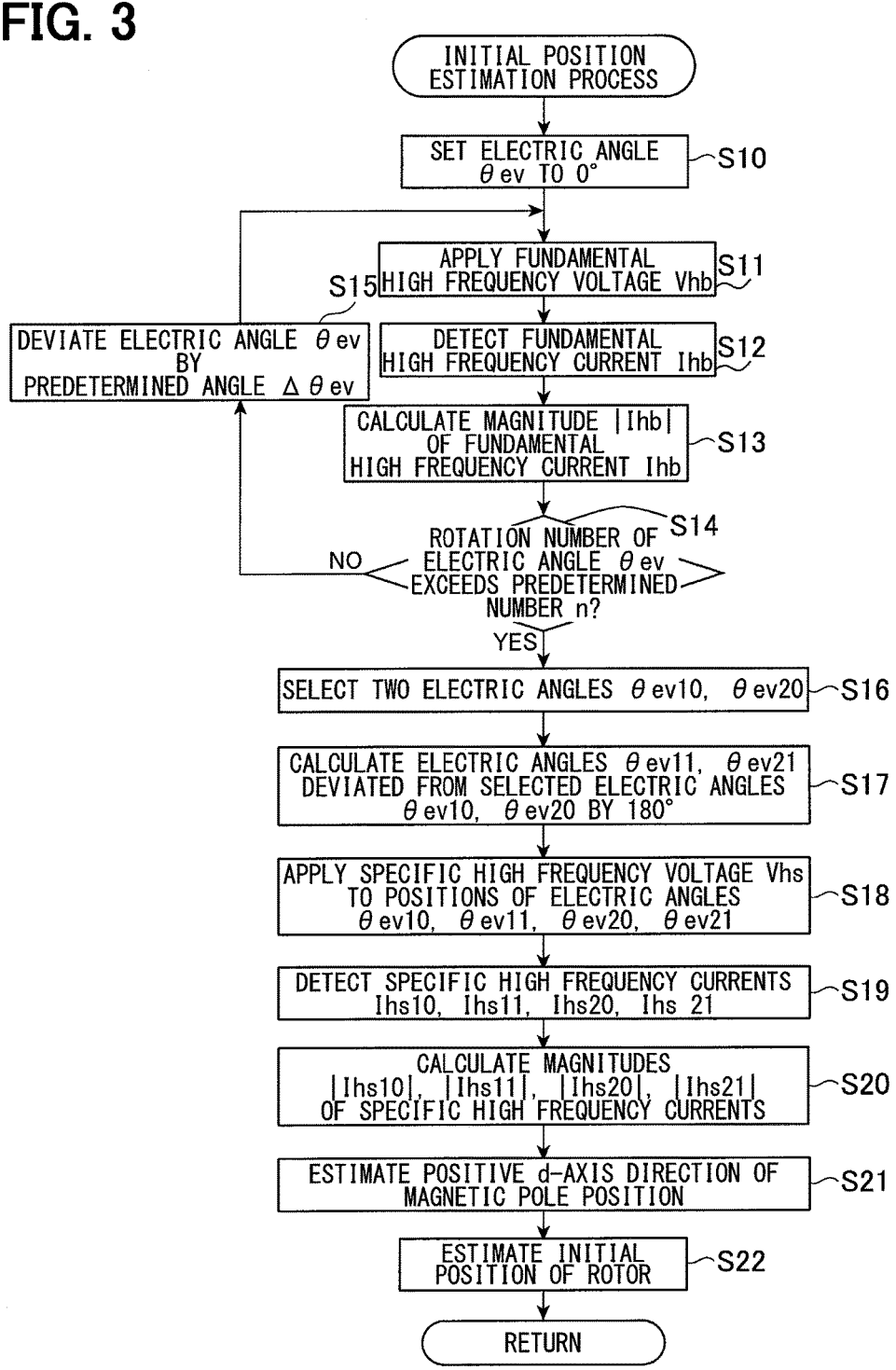
FIG. 3 is a flowchart showing a procedure of an initial position estimation process to be executed by the control device.

As shown in FIG. 3, the microcomputer 11 first sets a virtual electric angle θev to "0°" (S10). The electric angle θev is a virtual electric angle used until the estimation of the magnetic pole position of the rotor is completed. The electric angle θev is set within a range of "0°≤θev<360°". The position "0°" of the electric angle θev is set at a predetermined position on an ala coordinate system which is a fixed coordinate system, for example.

Figure 4:
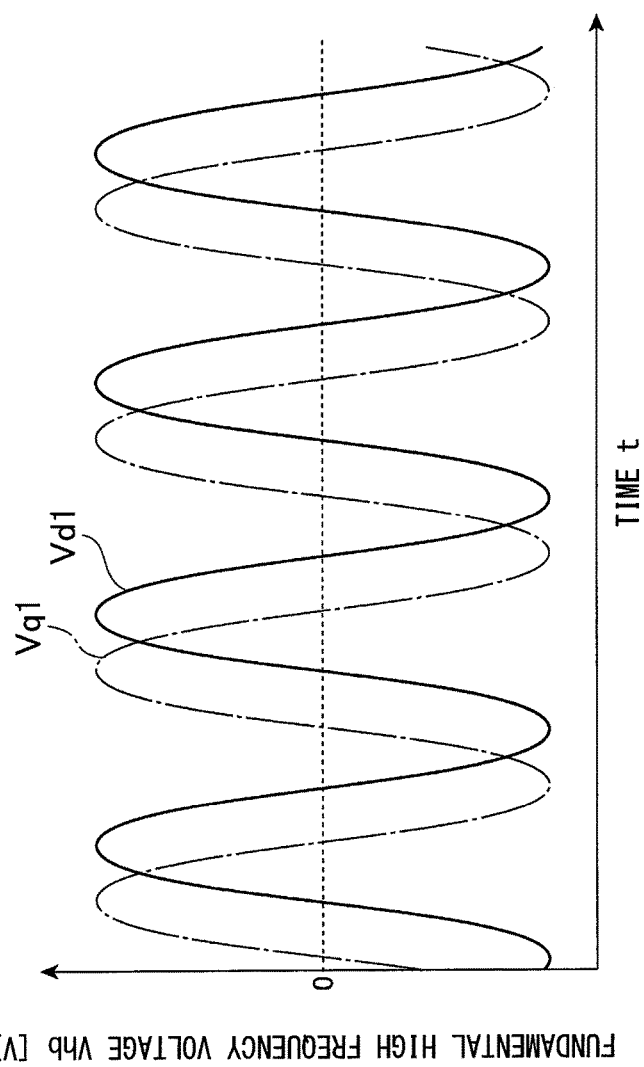
FIG. 4 is a graph showing an example of a waveform of a fundamental high frequency voltage Vhb.

Subsequently to S10, the microcomputer 11 applies a fundamental high frequency voltage Vhb to the electric motor 5 through the inverter circuit 4 (S11). As the fundamental high frequency voltage Vhb, for example, a d-axis voltage Vd1 and a q-axis voltage Vq1 shown in FIG. 4 can be used. The d-axis voltage Vd1 indicates a voltage in the direction of the virtual magnetic pole position of the rotor. The q-axis voltage Vq1 indicates a voltage in a direction orthogonal to the direction of the virtual magnetic pole position of the rotor. The d-axis voltage Vd1 and the q-axis voltage Vq1 change sinusoidally with a time t. The d-axis voltage Vd1 and the q-axis voltage Vq1 can be expressed by the following Expressions 1 and 2, respectively. In addition, "ω" indicates a frequency and "Va" indicates an amplitude.

$$Vd1 = Va \times \sin(\omega \cdot t + \pi/2) \quad \text{[Expression 1]}$$
$$= Va \times \sin(\theta ev + \pi/2)$$

$$Vq1 = Va \times \sin(\omega \cdot t) \quad \text{[Expressioln 2]}$$
$$= Va \times \sin(\theta ev)$$

The microcomputer 11 calculates the d-axis voltage Vd1 and the q-axis voltage Vq1 from Expressions 1 and 2 based on the electric angle θev. The microcomputer 11 subjects the calculated d-axis voltage Vd1 and the calculated q-axis voltage Vq1 to two-phase to three-phase conversion with the use of the electric angle θev to acquire three-phase voltage command values Vu, Vv, and Vw. Also, the microcomputer 11 generates the PWM signal from the three-phase voltage command values Vu, Vv, and Vw. The microcomputer 11 transmits the generated PWM signal to the pre-driver 12 to drive the inverter circuit 4, and applies the d-axis voltage Vd1 and the q-axis voltage Vq1 to the electric motor 5 as the fundamental high frequency voltage Vhb.

As shown in FIG. 3, subsequently to the process of S11, the microcomputer 11 detects the fundamental high frequency current Ihb generated in the electric motor 5 when the fundamental high frequency voltage Vhb is applied to the electric motor 5, through the current sensor (S12). Specifically, the microcomputer 11 detects the respective phase current values Iu, Iv, and Iw obtained when the fundamental high frequency voltage Vhb is applied to the electric motor 5 by the current sensor 8, and also subjects the detected respective phase current values Iu, Iv, and Iw to three-phase to two-phase conversion with the use of the electric angle θev, to thereby calculate the d-axis current Id and the q-axis current Iq. The microcomputer 11 detects the calculated d-axis current Id and q-axis current Iq as the fundamental high frequency current Ihb.

Subsequently to the process of S12, the microcomputer 11 calculates a magnitude |Ihb| of the fundamental high frequency current from the detection value of the fundamental high frequency current Ihb obtained in the process of S11 (S13). The microcomputer 11 calculates the magnitude |Ihb| of the fundamental high frequency current by, for example, the following Expression 3.

$$|Ihb| = Id^2 + Iq^2 \quad \text{[Expression 3]}$$

Subsequently to the process of S13, the microcomputer 11 determines whether the number of rotations of the electric angle θev has exceeded a predetermined number of times n, or not (S14). The predetermined number of times n is an integer of 1 or more and is set to a predetermined value.

When the value of the electric angle θev increases from "0°" and then decreases to become "0°" again, the microcomputer 11 determines that the electric angle θev makes one rotation.

When the number of rotations of the electric angle θev is equal to or less than the predetermined number of times n (no in S14), the microcomputer 11 deviates the electric angle θev by a predetermined angle Δθev (>0) (S15). Specifically, the microcomputer 11 adds a predetermined angle Δθev to a current value of the electric angle θev to deviate the electric angle θev.

Figure 5:
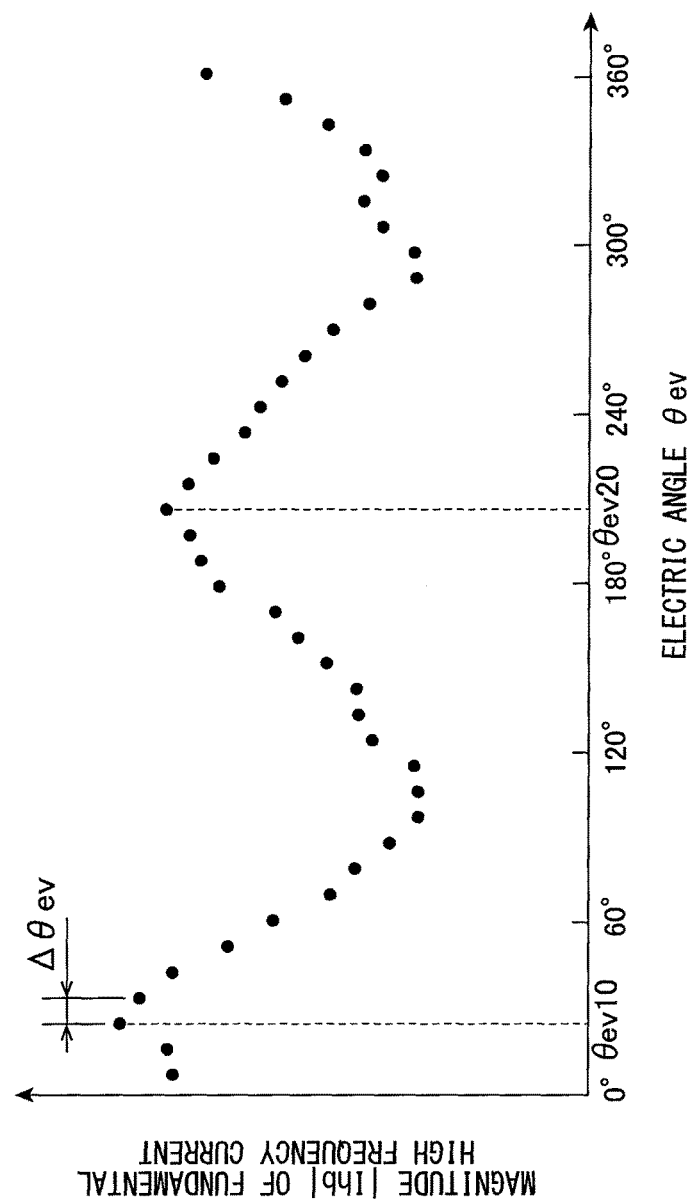
FIG. 5 is a graph showing an example of the transition of a magnitude |Ihb| of a fundamental high frequency current.
Figure 6:
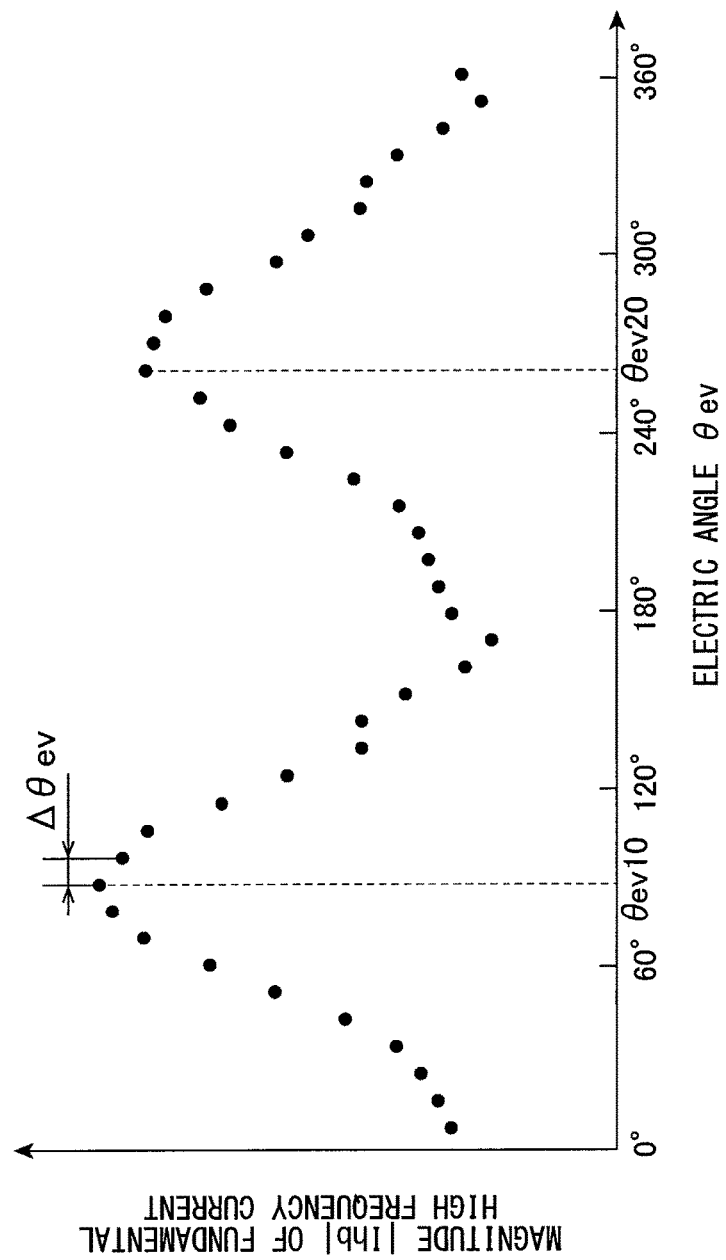
FIG. 6 is a graph showing an example of the transition of the magnitude |Ihb| of the fundamental high frequency current.

Subsequently to the process of S15, the microcomputer 11 returns to the process of S11 and again executes the processes of S11 to S14. As a result, the electric angle θev is sequentially deviated by the predetermined angle Δθev, and the microcomputer 11 acquires the detection value of the fundamental high frequency current Ihb and the magnitude |Ihb| of the detection value each time the electric angle θev is deviated by the predetermined angle Δθev. The microcomputer 11 repeats the processes of S11 to S14 until the rotation number of the electric angle θev reaches the predetermined number of times n. As a result, for example, when the predetermined number of times n is set to 1, the microcomputer 11 can acquire the detection value of the fundamental high frequency current Ihb and the magnitude |Ihb| of the detection value for one cycle at every predetermined electric angle Δθev. FIGS. 5 and 6 show examples of the magnitude |Ihb| of the fundamental high frequency current acquired by the microcomputer 11. Since FIGS. 5 and 6 illustrate the case where initial positions of the rotor are different from each other, waveforms of the magnitude |Ihb| of the fundamental high frequency current are different from each other. As shown in FIGS. 5 and 6, the magnitude |Ihb| of the fundamental high frequency current has two maximum values with respect to a change in one cycle of the electric angle θev. Also, when the initial positions of the rotor are different between the examples of FIGS. 5 and 6, the electric angle θev at which the magnitude |Ihb| of the fundamental high frequency current shows the maximum value shifts. When the predetermined number of times n is set to an integer equal to or larger than 2, the microcomputer 11 can acquire the detection value of the fundamental high frequency current Ihb and the magnitude |Ihb| of the detection value for multiple cycles at each predetermined electric angle Δθev.

As shown in FIG. 3, when the number of rotations of the electric angle θev exceeds the predetermined number of times n (yes in S14), the microcomputer 11 selects the two electric angle θev10 and electric angle θev20 at which the magnitude |Ihb| of the fundamental high frequency current becomes the maximum value (S16).

More specifically, when the magnitude |Ihb| of the fundamental high frequency current shown in FIG. 5 can be acquired, the microcomputer 11 calculates two electric angles θev10 and electric angle θev20 as shown in FIG. 5. When the magnitude |Ihb| of the fundamental high frequency current shown in FIG. 6 can be acquired, the microcomputer 11 selects two electric angles θev10 and electric angle θev20 as shown in FIG. 6.

Figure 7:
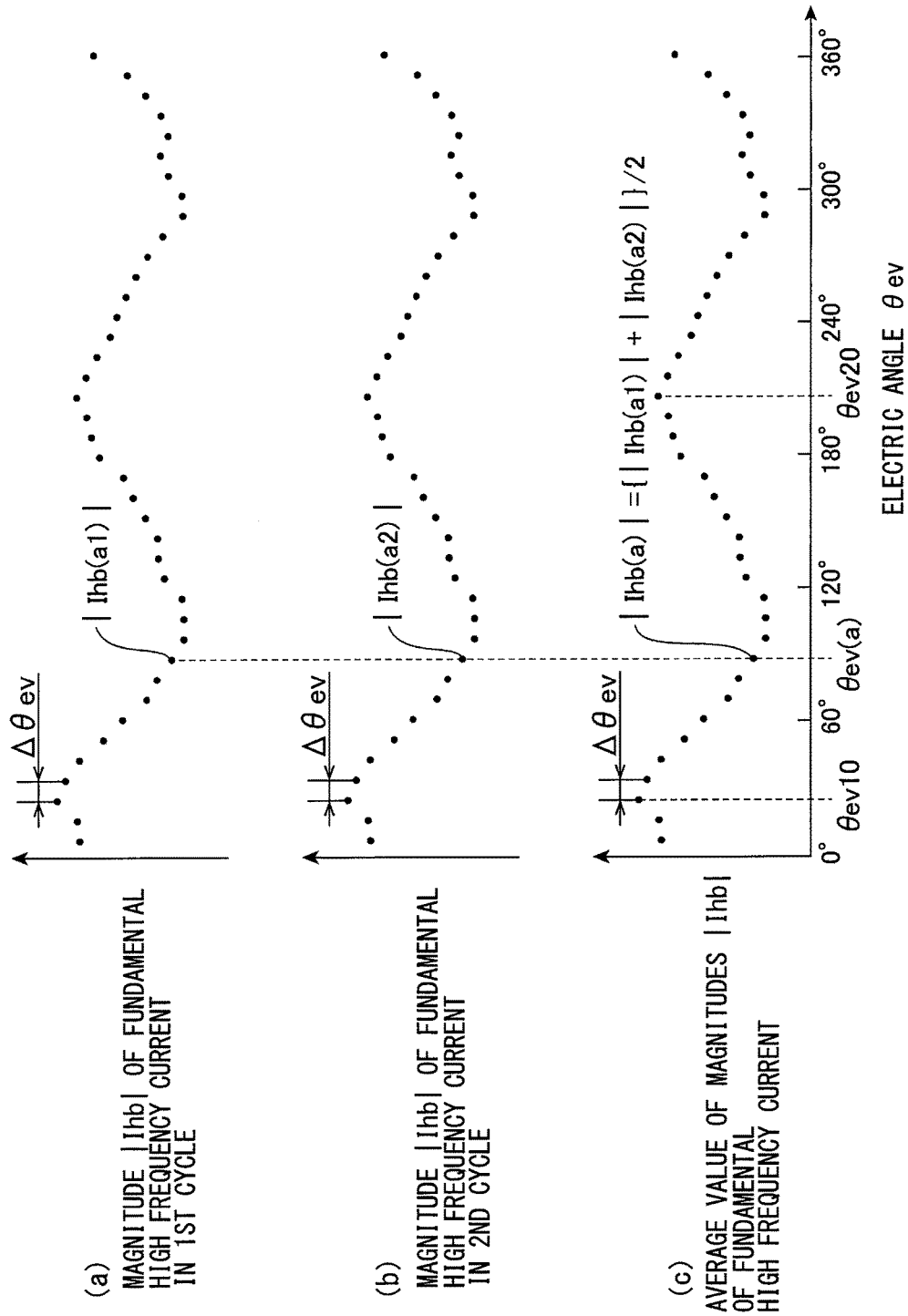
FIG. 7 is a graph in which (a) shows the transition of the magnitude |Ihb| of the fundamental high frequency current in a first cycle, (b) shows the transition of the magnitude |Ihb| of the fundamental high frequency current in a second cycle, and (c) shows the transition of an average value of the magnitude |Ihb| of the fundamental high frequency current.

On the other hand, when the predetermined number of times n is set to an integer equal to or greater than 2, the microcomputer 11 can detect the magnitude |Ihb| of the fundamental high frequency current at each electric angle Δθev shown in FIGS. 5 and 6 in multiple cycles. In that case, the microcomputer 11 calculates an average value of the magnitude |Ihb| of the fundamental high frequency current at each electric angle Δθev according to the magnitude |Ihb| of the fundamental high frequency current at each electric angle Δθev detected in the multiple cycles. For example, when "n" is set to 2, as shown in (a) of FIG. 7 and (b) of FIG. 7, it is assumed that the microcomputer 11 acquires "|Ihb(a1)|" in a first cycle and acquires "|Ihb(a2)|" in a second cycle, as the magnitude |Ihb| of the fundamental high frequency current corresponding to an electric angle θev(a). In that case, as shown in (c) of FIG. 7, the microcomputer 11 calculates an average value "{|Ihb(a1)|+|Ihb(a2)|}/2" of those acquired magnitudes, and uses a calculated value as the magnitude |Ihb(a)| of the fundamental high frequency current corresponding to the electric angle θev(a). With the above calculation, the microcomputer 11 acquires the average value of the magnitudes |Ihb| of the fundamental high frequency current at every acquired electric angle Δθev. The microcomputer 11 acquires the two electric angles θev10 and electric angle θev 20 at which the average value of the magnitude |Ihb| of the fundamental high frequency current at each acquired electric angle Δθev becomes the maximum value.

Figure 8:
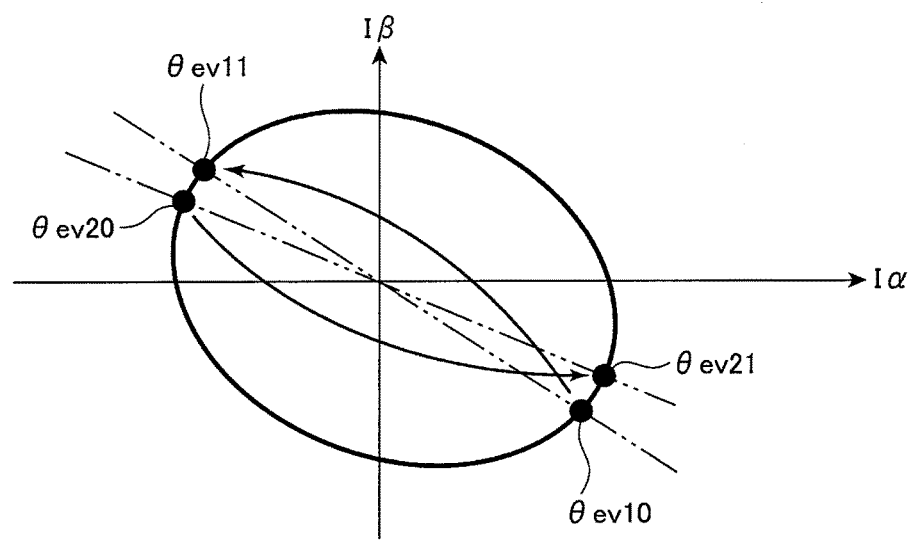
FIG. 8 is a graph showing a vector trajectory of the high frequency current on a fixed orthogonal coordinate system.

The microcomputer 11 executes a process of S16, shown in FIG. 3 to acquire the two electric angles θev10 and θev20 showing the maximum values in the elliptic trajectory of the fundamental high frequency current Ihb as shown in FIG. 8.

As shown in FIG. 3, subsequently to the process of S16, the microcomputer 11 calculates an electric angle θev11 and an electric angle θev21 that are deviated from the electric angle θev10 and the electric angle θev20 by 180° (S17). Specifically, the microcomputer 11 calculates the electric angle θev11 and the electric angle θev21 based on the following Expressions 4 and 5.

$$\theta ev11 = \theta ev10 + 180° \qquad \text{[Expression 4]}$$

$$\theta ev21 = \theta ev20 + 180° \qquad \text{[Expression 5]}$$

As a result, the microcomputer 11 can acquire the four electric angles θev10, θev11, θev20, and θev21 as shown in FIG. 8. In the present embodiment, the four electric angles θev10, θev11, θev20, and θev21 correspond to a first electric angle, a second electric angle, a third electric angle, and a fourth electric angle, respectively.

As shown in FIG. 3, subsequently to the process of S17, the microcomputer 11 applies a specific high frequency voltage Vhs to the positions of electric angles θev10, θev11, θev20, and θev21 through the inverter circuit 4 (S18). As the specific high frequency voltage Vhs, for example, a d-axis voltage Vd2 that changes in a rectangular waveform (pulse shape) with time as shown in (a) of FIG. 9 can be used. Specifically, the d-axis voltage Vd2 is set to a predetermined voltage value Vd20 during a period from an application start time t10 of the voltage to a time t11 when a predetermined time T10 elapses, and the d-axis voltage Vd2 is set to "0" after the time t11. A q-axis voltage Vq2 is set to "0". The microcomputer 11 subjects the d-axis voltage Vd2 and the q-axis voltage Vq2 to two-phase to three-phase conversion with the use of the respective electric angles θev10, θev11, θev20, and θev21, to thereby acquire the three-phase voltage command values Vu, Vv, and Vw. Also, the microcomputer 11 generates the PWM signal from the three-phase voltage command values Vu, Vv, and Vw. The microcomputer 11 transmits the generated PWM signal to the pre-driver 12 to drive the inverter circuit 4, and applies the specific high frequency voltage Vhs to the positions of the electric angles θev10, θev11, θev20, and θev21.

Figure 9:
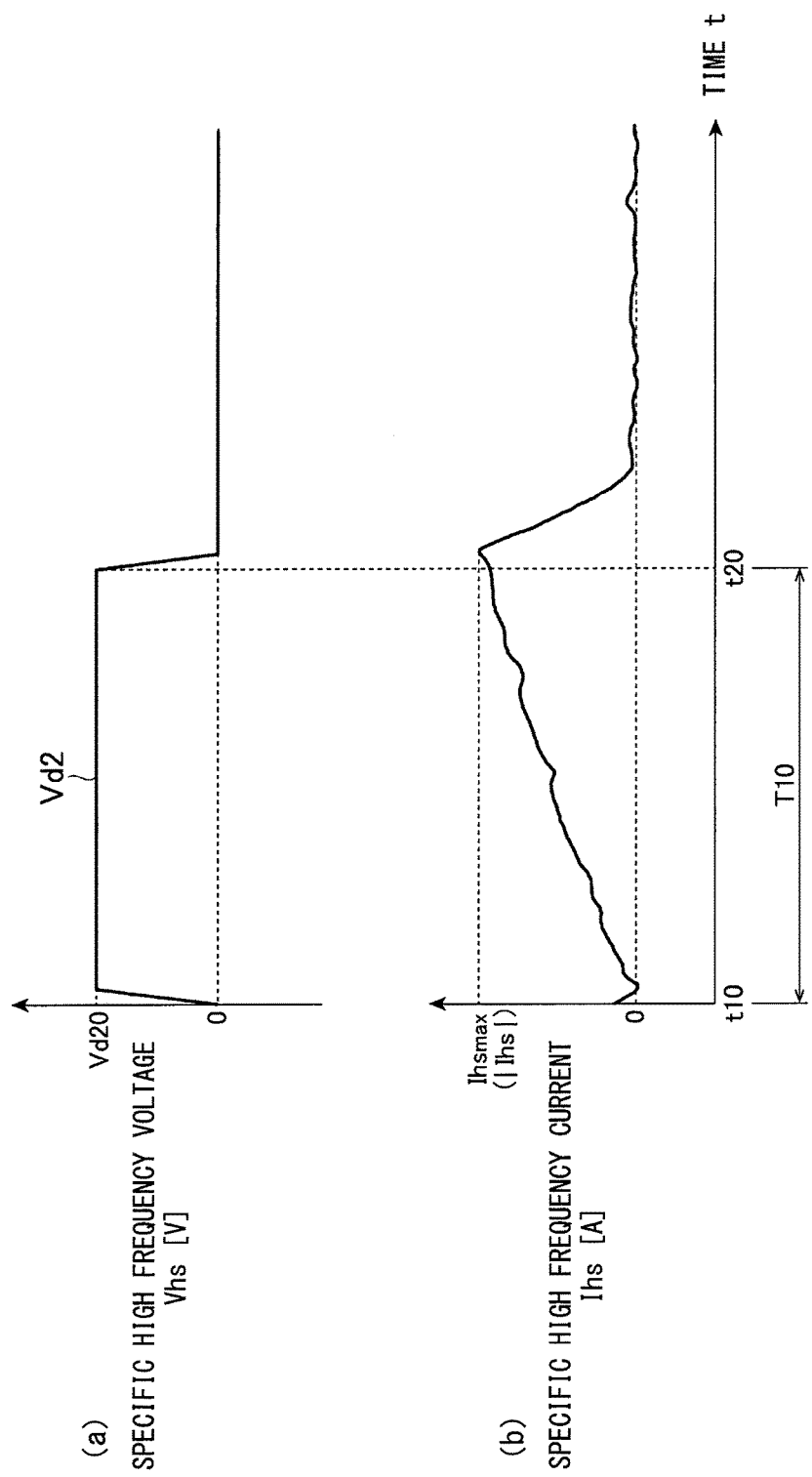
FIG. 9 is a graph in which (a) shows an example of a waveform of a specific high frequency voltage Vhs, and (b) shows an example of the transition of a specific high frequency current Ihs.

When the specific high frequency voltage Vhs is applied to the positions of the electric angles θev10, θev11, θev20, and θev21, the current Ihs of the electric motor 5 changes as shown in (b) of FIG. 9. The current Ihs corresponds to a specific high frequency current. In the present embodiment, the specific high frequency current Ihs is a d-axis current. The specific high frequency current Ihs gradually increases during a period when the d-axis voltage Vd2 is set to a predetermined voltage value Vd20, and reaches a maximum value Ihsmax, and then decreases to around "0".

As shown in FIG. 3, subsequently to the process of S18, the microcomputer 11 detects the specific high frequency currents Ihs10, Ihs11, Ihs20, and Ihs21 at the time of applying the specific high frequency voltage Vhs to the positions of the respective electric angles θev10, θev11, θev20, and θev21, through the current sensor 8 (S19). In the present embodiment, the respective detection values of the specific high frequency currents Ihs10, Ihs11, Ihs20, and Ihs21 correspond to detection values of a first specific high frequency current, a detection value of a second specific high frequency current, a detection value of a third specific high frequency current, and a detection value of a fourth specific high frequency current, respectively.

Subsequently to the process of S19, the microcomputer 11 calculates the magnitudes |Ihs10|, |Ihs11|, |Ihs20|, and |Ihs21| of the specific high frequency currents Ihs10, Ihs11, Ihs20, and Ihs21 (S20). Specifically, when acquiring the detection value of the specific high frequency current Ihs that changes as shown in (b) of FIG. 9, the microcomputer 11 calculates the maximum value Ihsmax as the magnitude |Ihs| of the specific high frequency current. The microcomputer 11 performs the above calculation on the detection values of the specific high frequency currents Ihs10, Ihs11, Ihs20, and Ihs21, to thereby calculate the magnitudes |Ihs10|, |Ihs11|, |Ihs20|, and |Ihs21| of the specific high frequency current for the respective electric angles θev10, θev11, θev20, and θev21.

As shown in FIG. 3, subsequently to the process of S20, the microcomputer 11 compares the magnitudes |Ihs10|, |Ihs11|, |Ihs20|, and |Ihs21| of the specific high frequency current with each other to estimate the positive d-axis direction of the magnetic pole position (S21). Specifically, the microcomputer 11 selects a maximum value from the magnitudes |Ihs10|, |Ihs11|, |Ihs20|, and |Ihs21| of the specific high frequency current. The microcomputer 11 estimates the position of the electric angle corresponding to the magnitude of the selected specific high frequency current as the positive d-axis direction of the magnetic pole position. For example, when the magnitude |Ihs10| of the specific high frequency current is the maximum value, the microcomputer 11 estimates that the position of the electric angle θev10 corresponding to the magnitude |Ihs10| of the specific high frequency current is the positive d-axis direction of the magnetic pole position.

Subsequently to the process of S21, the microcomputer 11 estimates an initial position of the rotor based on the estimated positive d-axis direction of the magnetic pole position (S22). For example, the microcomputer 11 calculates the initial position of the rotor according to the electric angle corresponding to the estimated positive d-axis direction of the magnetic pole position and the electric angle formed by the position of "0°" of the electric angle θev with respect to the fixed coordinate system.

According to the ECU 10 of the electric motor 5 in the present embodiment described above, the following operations and effects can be obtained.

In the ECU 10 according to the present embodiment, if the voltage value Vd20 of the specific high frequency voltage Vhs to be applied to the positions of the electric angles θev10, θev11, θev20, and θev21 is increased, a difference of the magnitudes |Ihs10|, |Ihs11|, |Ihs20|, and |Ihs21| of the respective specific high frequency currents increases. For that reason, the estimation accuracy of the positive d-axis direction of the magnetic pole position can be improved. This makes it possible to reduce the heat generation of the inverter circuit 4 and the electric motor 5, for example, as compared with the ECU of the conventional electric motor that is required to increase the high frequency voltage over the entire range of the electric angle. Also, with the reduction of the heat generation, the device including the heat radiation measures can be restricted from being upsized. In other words, in the ECU 10 of the present embodiment, the device can be downsized and the cost can be reduced as compared with the ECU of the conventional electric motor. Incidentally, the power consumption can be reduced as compared with the ECU of the conventional electric motor which needs to increase the high frequency voltage over the entire range of the electric angle.

The microcomputer 11 acquires two electric angles θev10 and θev20 at which the magnitude |Ihb| of the fundamental high frequency current becomes the maximum value. Further, the microcomputer 11 calculates the electric angle θev11 and the electric angle θev21 that are deviated by 180° from the respective electric angles θev10 and electric angle θev20. The microcomputer 11 estimates the positive d-axis direction of the magnetic pole position from the four electric angles θev10, θev11, θev20, and θev21. As a result, as compared with the case where the positive d-axis direction of the magnetic pole position is estimated by only the electric angle obtained from the current elliptical trajectory, the microcomputer 11 can improve the estimation accuracy of the positive d-axis direction of the magnetic pole position because the positive d-axis direction of the magnetic pole position is estimated by the electric angle specified to some extent. In addition, since the four electric angles θev10, θev11, θev20, and θev21 correspond to the d-axis direction of the magnetic pole position, a specific high frequency voltage suitable for comparing the magnitude of the specific high frequency current with each other can be applied, thereby being capable of improving the estimation accuracy of the positive d-axis direction of the magnetic pole position.

When the predetermined number of times n used in the process of S14 in FIG. 3 is set to an integer equal to or greater than 2, the microcomputer 11 calculates an average value of the magnitudes |Ihb| of the fundamental high frequency current for each electric angle Δθev according to the magnitude θ|Ihb| of the fundamental high frequency current for each of the electric angles Δθev detected in the multiple cycles. In addition, the microcomputer 11 selects the two electric angles θev10 and θev20 at which the average value of the magnitudes |Ihb| of the fundamental high frequency current at each electric angle Δθev becomes the maximum value. As a result, as compared with the case where the predetermined number of times n is set to "1", that is, the case where the magnitude |Ihb| of the fundamental high frequency current at each electric angle Δθev is acquired for only one cycle, the two maximum values of the magnitude |Ihb| of the fundamental high frequency current can be selected with higher accuracy. As a result, the estimation accuracy of the positive d-axis direction of the magnetic pole position can be improved.

The above-described embodiments can be implemented by the following configurations.

The fundamental high frequency voltage Vhb used in S11 of FIG. 3 is not limited to the voltage represented by the d-axis voltage Vd1 and the q-axis voltage Vq1, and can be appropriately changed. For example, the fundamental high frequency voltage Vhb may be represented by an α-axis voltage Vα and a β-axis voltage Vβ on the αβ coordinate system which is a fixed coordinate system. The α-axis voltage Vα and the β-axis voltage Vβ can be expressed by the following Expressions 6 and 7, respectively.

$$V\alpha = V \times \sin(\theta ev + \pi/2) \quad \text{[Expression 6]}$$

$$V\beta = V \times \sin(\theta ev) \quad \text{[Expression 7]}$$

The method of deviating the electric angle θev in S15 of FIG. 3 is not limited to the method of adding the predetermined angle Δθev to the electric angle θev, an appropriate method such as a method of subtracting the predetermined angle Δθev from the electric angle θev can be employed.

The method of calculating the magnitude |Ihb| of the fundamental high frequency current in S13 of FIG. 3 is not limited to the method based on Expression 3, and can be appropriately changed. For example, the microcomputer 11 may calculate the magnitude |Ihb| of the fundamental high frequency current based on Expression 8 described below.

$$|Ihb| = \sqrt{(Id^2 + Iq^2)} \quad \text{[Expression 8]}$$

Further, the microcomputer 11 may use the d-axis current Id and a squared value Id² of the d-axis current Id as the magnitude |Ihb| of the fundamental high frequency current. Furthermore, the method of calculating the magnitude |Ihb| of the fundamental high frequency current in S13 of FIG. 3 is not limited to the method using the d-axis current Id and the q-axis current Iq, and can be appropriately changed. For example, the microcomputer 11 may calculate the magnitude |Ihb| of the fundamental high frequency current with the use of the α-axis current and the β-axis current on the αβ coordinate system which is a fixed coordinate system. Further, the microcomputer 11 may calculate the magnitude |Ihb| of the fundamental high frequency current with the use of each phase current value of the three-phase coordinate system (UVW coordinate system) which is a fixed coordinate system. Similarly, the method of calculating the magnitudes |Ihs10|, |Ihs 11|, |Ihs 20|, and |Ihs21| of the specific high frequency current in S20 of FIG. 3 can be changed as appropriate.

The frequency ω of the fundamental high frequency voltage Vhb is effectively set to a frequency higher than the frequency of the drive voltage used for driving the electric motor 5. As a result, the voltage used for estimating the initial position of the rotor and the voltage used for driving the electric motor 5 can be separated from each other by frequency. Therefore, because the microcomputer 11 can separately execute the initial position estimation process and the start control of the electric motor 5 at the initial stage of executing the start control of S2 in FIG. 2, the microcomputer 11 can smoothly switch from the initial position estimation process to the activation control.

The microcomputer 11 may carry out the processes from S11 to S16 shown in FIG. 3 multiple times and select the two electric angles θev10 and the electric angle θev20 at which the magnitude |Ihb| of the fundamental high frequency current becomes the maximum value based on the processing results of the multiple times. In other words, the microcomputer 11 may perform the estimation of the d-axis direction of the magnetic pole position multiple times and select the two electric angles θev10 and θev20 corresponding to the d-axis direction of the magnetic pole position based on the estimation result. As a result, the estimation accuracy of the electric angle corresponding to the d-axis direction of the magnetic pole position can be improved.

The microcomputer 11 may execute the initial position estimation process of S1 shown in FIG. 2 multiple times and estimate the initial position of the rotor based on the estimation results of the multiple processes. As a result, the estimation accuracy of the initial position of the rotor, in other words, the positive d-axis direction of the magnetic pole position can be improved.

Figure 10:
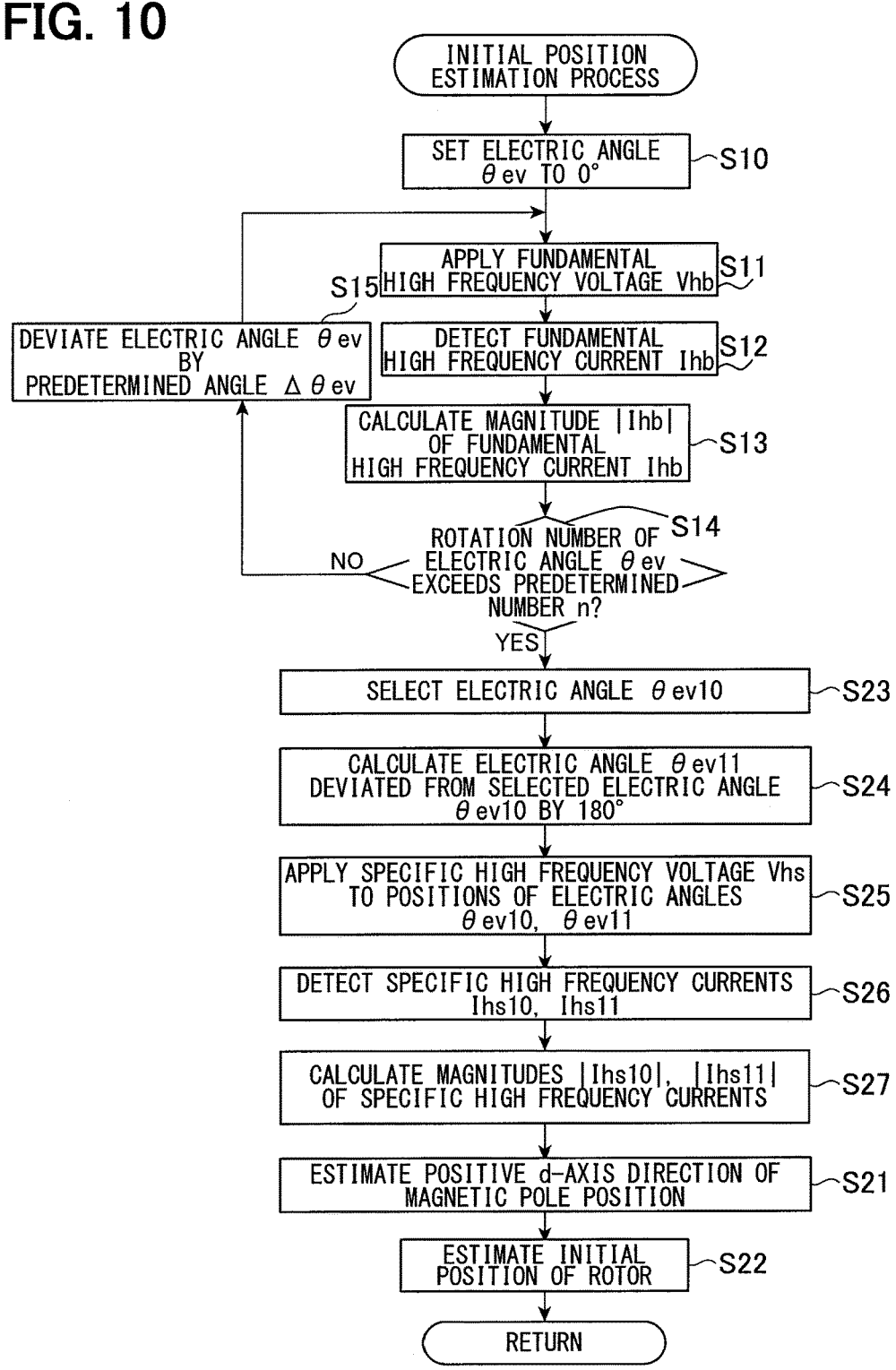
FIG. 10 is a flowchart showing a procedure of an initial position estimation process to be executed by an electric motor control device according to another embodiment.
Figure 11:
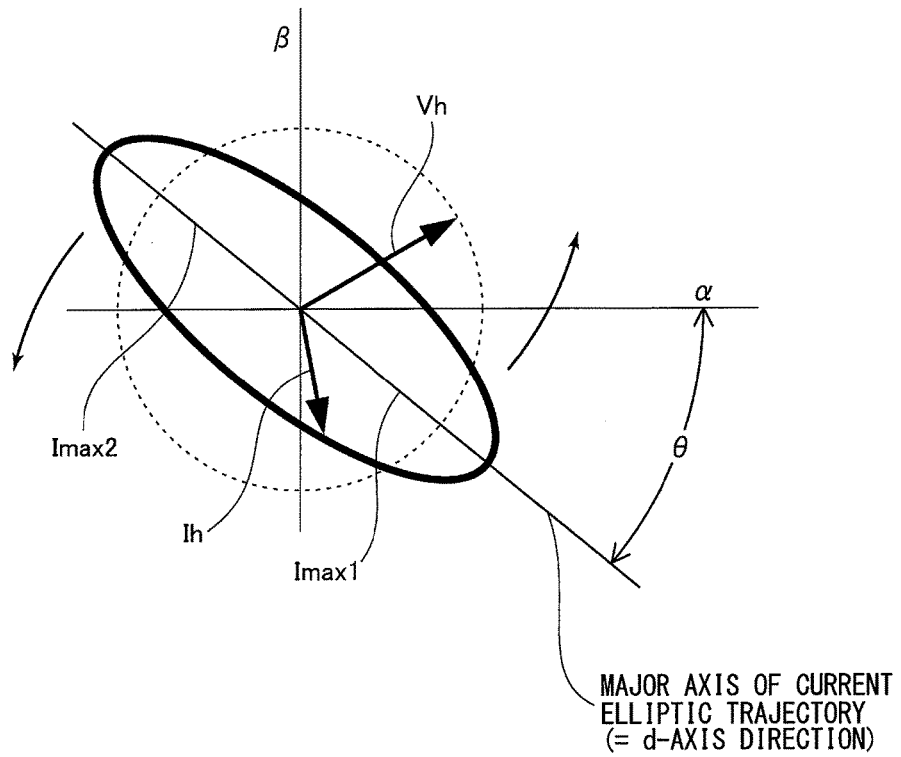
FIG. 11 is a graph showing vector trajectories of the high frequency voltage and the high frequency current on a fixed orthogonal coordinate system.
Figure 12:
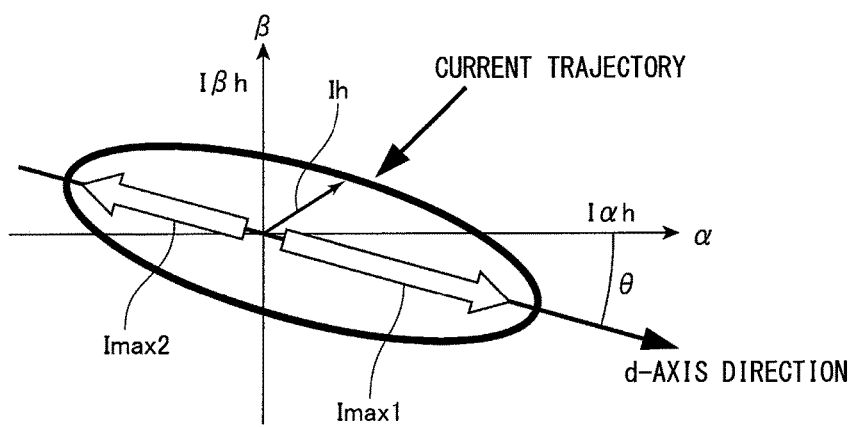
FIG. 12 is a graph showing the vector trajectories of the high frequency voltage and the high frequency current on the fixed orthogonal coordinate system in a saturated state.

The microcomputer 11 may determine the positive d-axis direction of the magnetic pole position based on only one of the two electric angle θev10 and electric angle θev20 at which the magnitude |Ihb| of the fundamental high frequency current at every electric angle Δθev exhibits the maximum value. For example, as shown in FIG. 10, the microcomputer 11 selects one electric angle θev10 at which the magnitude |Ihb| of the fundamental high frequency current at each electric angle Δθev exhibits the maximum value (S23). More specifically, the microcomputer 11 compares the magnitude of the fundamental high frequency current corresponding to one electric angle indicating the maximum value with the magnitude of the fundamental high frequency current corresponding to the other electric angle indicating the maximum value to select the electric angle corresponding to the larger fundamental high frequency current as the electric angle θev10. In other words, the electric angle θev10 is an electric angle corresponding to the maximum value of the magnitude |Ihb| of the fundamental high frequency current. Subsequently to the process of S23, after executing the processes of S24, to S27 conforming to the processes of S17 to S20 in FIG. 3, the microcomputer 11 compares the magnitudes |Ihs10| and |Ihs11| of the specific high frequency current with each other to estimate the positive d-axis direction of the magnetic pole position (S21). Even with the method described above, the positive d-axis direction of the magnetic pole position can be estimated.

The microcomputer 11 may use an electric angle that is deviated from the electric angle θev10 by a predetermined angle θα as the electric angle θev11. The predetermined angle θα is an angle slightly deviated from 180°, for example. Similarly, the microcomputer 11 may use, as the electric angle θev21, an electric angle deviated from the electric angle θev20 by the predetermined angle θα.

The fundamental high frequency voltage Vhb is not limited to the high frequency voltage that changes sinusoidally with time, and a high frequency voltage having any waveform can be used. In short, the fundamental high frequency voltage Vhb may be a high frequency voltage capable of determining the electric angle corresponding to the d-axis direction of the magnetic pole position.

The specific high frequency voltage Vhs is not limited to the high frequency voltage that changes in the rectangular waveform with time, and a high-frequency voltage having any waveform such as a sinusoidal waveform or a trapezoidal waveform can be used, for example. In short, the specific high frequency voltage Vhs may be a high frequency voltage capable of selecting the electric angle corresponding to the positive d-axis direction of the magnetic pole position from multiple candidates of the electric angle corresponding to the d-axis direction of the magnetic pole position.

The configuration of the ECU 10 of the electric motor 5 according to the embodiment is not limited to the control system 1 for driving the compressor 6, but can be applied to a control system for driving any equipment. In many cases, the vehicle electric compressor is designed to have a relatively small saliency ratio for the purpose of enabling the driving in a wide voltage range with high efficiency. The configuration of the ECU 10 of the electric motor 5 according to the embodiment is particularly effective for the synchronous motor having a small saliency ratio described above.

The present disclosure is not limited to examples described hereinabove. Various design changes can be made by those skilled in the art in the present disclosure. For example, elements and arrangements or conditions of the elements are not limited to the examples and may be modified. Furthermore, various combinations including the elements may be made in the present disclosure as far as technically possible.

What is claimed is:

1. An electric motor control device that controls driving of an electric motor based on a magnetic pole position of a rotor, the electric motor control device comprising:
    a control unit that controls operation of a drive circuit supplying an electric power to the electric motor; and
    a current sensor that detects a current generated in the electric motor, wherein
    the control unit detects, through the current sensor, a fundamental high frequency current generated in the electric motor when the electric motor is applied with a fundamental high frequency voltage for estimating the magnetic pole position through the drive circuit, and selects a first electric angle and a second electric angle corresponding to a d-axis direction of the magnetic pole position based on a detection value of the fundamental high frequency current,
    the control unit detects, through the current sensor, a first specific high frequency current generated in the electric motor when a position of the first electric angle is applied with a specific high frequency voltage through the drive circuit and a second specific high frequency current generated in the electric motor when a position of the second electric angle is applied with the specific high frequency voltage through the drive circuit, and
    the control unit compares a detection value of the first specific high frequency current with a detection value of the second specific high frequency current to estimate a positive d-axis direction of the magnetic pole position.

2. The electric motor control device according to claim 1, wherein
    the control unit detects, through the current sensor, the fundamental high frequency current, which is generated in the electric motor when the electric motor is applied with the fundamental high frequency voltage through the drive circuit, at every predetermined electric angle,
    the control unit calculates a magnitude of the fundamental high frequency current at every predetermined electric angle based on the detection value of the fundamental high frequency current detected at every predetermined electric angle,
    the control unit uses an electric angle at which the magnitude of the fundamental high frequency current is maximum as the first electric angle, and
    the control unit uses an electric angle deviated from the first electric angle by 180° as the second electric angle.

3. The electric motor control device according to claim 1, wherein
    the control unit detects, through the current sensor, the fundamental high frequency current, which is generated in the electric motor when the electric motor is applied with the fundamental high frequency voltage through the drive circuit, at every predetermined electric angle and for a plurality of cycles,
    the control unit calculates an average value of magnitudes of the fundamental high frequency currents at every predetermined electric angle based on the detection values of the fundamental high frequency currents detected at every predetermined electric angle and for the plurality of cycles,
    the control unit uses an electric angle at which the average value of the magnitudes of the fundamental high frequency currents is maximum as the first electric angle, and
    the control unit uses an electric angle deviated from the first electric angle by 180° as the second electric angle.

4. The electric motor control device according to claim 1, wherein
    the control unit further estimates a third electric angle and a fourth electric angle corresponding to the d-axis direction of the magnetic pole position based on the detection value of the fundamental high frequency current,
    the control unit detects, through the current sensor, a third specific high frequency current generated in the electric motor when a position of the third electric angle is applied with the specific high frequency voltage through the drive circuit and a fourth specific high frequency current generated in the electric motor when a position of the fourth electric angle is applied with the specific high frequency voltage through the drive circuit, and
    the control unit compares the detection value of the first specific high frequency current, the detection value of the second specific high frequency current, a detection value of the third specific high frequency current, and a detection value of the fourth specific high frequency current with each other to estimate a positive d-axis direction of the magnetic pole position.

5. The electric motor control device according to claim 4, wherein
    the control unit detects, through the current sensor, the fundamental high frequency current, which is generated in the electric motor when the electric motor is applied with the fundamental high frequency voltage through the drive circuit, at every predetermined electric angle,
    the control unit calculates a magnitude of the fundamental high frequency current at every predetermined electric angle based on the detection value of the fundamental high frequency current detected at every predetermined electric angle,
    the control unit uses two electric angles at which the magnitude of the fundamental high frequency current is maximum as the first electric angle and the third electric angle,
    the control unit uses an electric angle deviated from the first electric angle by 180° as the second electric angle, and
    the control unit uses an electric angle deviated from the third electric angle by 180° as the fourth electric angle.

6. The electric motor control device according to claim 4, wherein
    the control unit detects, through the current sensor, the fundamental high frequency current, which is generated in the electric motor when the electric motor is applied with the fundamental high frequency voltage through the drive circuit, at every predetermined electric angle and for a plurality of cycles,
    the control unit calculates an average value of magnitudes of the fundamental high frequency currents at every predetermined electric angle based on the detection values of the fundamental high frequency currents detected at every predetermined electric angle and for the plurality of cycles, the control unit uses two electric angles at which the average value of the magnitudes of the fundamental high frequency currents is maximum as the first electric angle and the third electric angle, the control unit uses an electric angle deviated from the first electric angle by 180° as the second electric angle, and the control unit uses an electric angle deviated from the third electric angle by 180° as the fourth electric angle.

7. The electric motor control device according to claim 1, wherein
the fundamental high frequency voltage has a frequency higher than a frequency of a drive voltage used for driving the electric motor.

8. The electric motor control device according to claim 1, wherein
the control unit estimates the d-axis direction of the magnetic pole position a plurality of times and estimates the d-axis direction of the magnetic pole position based on a plurality of estimation results.

9. The electric motor control device according to claim 1, wherein
the control unit estimates a positive d-axis direction of the magnetic pole position a plurality of times and estimates the positive d-axis direction of the magnetic pole position based on a plurality of estimation results.

10. The electric motor control device according to claim 1, wherein
the fundamental high frequency voltage changes sinusoidally with time.

11. The electric motor control device according to claim 1, wherein
the specific high frequency voltage changes in a rectangular waveform with time.

12. The electric motor control device according to claim 1, wherein
the electric motor is used as a power source of a vehicle electric compressor.

* * * * *